(12) United States Patent
Yokoyama

(10) Patent No.: US 11,514,359 B2
(45) Date of Patent: Nov. 29, 2022

(54) DISTRIBUTED MACHINE LEARNING DEVICE, DISTRIBUTED MACHINE LEARNING METHOD, AND DISTRIBUTED MACHINE LEARNING RECORDING MEDIUM

(71) Applicant: NEC Corporation, Tokyo (JP)

(72) Inventor: Harumichi Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 640 days.

(21) Appl. No.: 16/490,650

(22) PCT Filed: Mar. 9, 2018

(86) PCT No.: PCT/JP2018/009227
§ 371 (c)(1),
(2) Date: Sep. 3, 2019

(87) PCT Pub. No.: WO2018/168695
PCT Pub. Date: Sep. 20, 2018

(65) Prior Publication Data
US 2019/0385083 A1    Dec. 19, 2019

(30) Foreign Application Priority Data

Mar. 17, 2017 (JP) .............................. JP2017-052812

(51) Int. Cl.
*G06N 20/00* (2019.01)
*G06N 5/04* (2006.01)
*H04L 67/10* (2022.01)

(52) U.S. Cl.
CPC ............... *G06N 20/00* (2019.01); *G06N 5/04* (2013.01); *H04L 67/10* (2013.01)

(58) Field of Classification Search
CPC ........... G06N 20/00; G06N 5/04; H04L 67/10
See application file for complete search history.

(56) References Cited

U.S. PATENT DOCUMENTS 9,015,083 B1    4/2015  Monga et al.
2016/0078361 A1*  3/2016  Brueckner .............. H04L 67/10
706/12

FOREIGN PATENT DOCUMENTS

JP            11259433 A      9/1999

OTHER PUBLICATIONS

Scherrer, C., et al., "Feature Clustering for Accelerating Parallel Coordinate Descent", NIPS'12 Proceedings of the 25th International Conference on Neural Information Processing Systems, 2012, pp. 28-36 (pp. 1-9).
International Search Report and Written Opinion, dated Jun. 5, 2018 from the International Bureau in counterpart International application No. PCT/JP2018/009227.

\* cited by examiner

Primary Examiner — El Hadji M Sall
(74) Attorney, Agent, or Firm — Sughrue Mion, PLLC

(57) ABSTRACT

Provided is a distributed machine learning device which can efficiently converge a plurality of parameters. The distributed machine learning device includes: block configuration determination unit that determines a plurality of configurations of blocks each being a subset of a plurality of parameters used for a prediction model, and acquires a change amount of each subset of parameters belonging to the block, based on a result of executing processing of optimizing the plurality of parameters, and changes an element of the subset of the parameters in the block, based on the acquired change amount.

13 Claims, 12 Drawing Sheets

Fig. 2

PARAMETER INFORMATION STORAGE UNIT 130

| PARAMETER ID | VALUE | GRADIENT VALUE |
|---|---|---|
| 1 | 0.34 | 0.22 |
| 2 | -0.76 | 0.07 |
| 3 | 1.12 | -0.19 |
| ... | ... | ... |

Fig. 3

BLOCK INFORMATION STORAGE UNIT 120

| BLOCK ID | BELONGING PARAMETER ID |
|----------|------------------------|
| 1 | 7, 82, 567, 713, .. |
| 2 | 469, 748, 1831, .. |
| 3 | 223, 898, 2336, .. |
| ... | ... |

Fig. 9

PARAMETER CHARACTERISTIC STORAGE UNIT 260

| PARAMETER ID | CHARACTERISTIC |
|---|---|
| 1 | (0.34, 2.45, 5.44, ...) |
| 2 | (0.88, 8.31, 10.1, ...) |
| 3 | (1.2, 0.3, 8.52, ...) |
| ... | ... |

DISTRIBUTED MACHINE LEARNING DEVICE, DISTRIBUTED MACHINE LEARNING METHOD, AND DISTRIBUTED MACHINE LEARNING RECORDING MEDIUM

This application is a National Stage Entry of PCT/JP2018/009227 filed on Mar. 9, 2018, which claims priority from Japanese Patent Application 2017-052812 filed on Mar. 17, 2017, the contents of all of which are incorporated herein by reference, in their entirety.

TECHNICAL FIELD

The present invention relates to a technique of executing machine learning in a distributed manner.

BACKGROUND ART

Machine learning has been actively studied in recent years. Machine learning is predicting for unknown data or a future event by learning regularity from a large number of data, or is a means that achieves the same. When prediction is performed, a prediction model is generated by use of a function with which a value is determined by a characteristic amount of data and a parameter. An object of machine learning is to determine a parameter of a prediction model that can perform correct prediction. To be more specific, the object is to optimize, for a parameter, a loss function calculated from a prediction model and given data.

A learning time is increased by several factors. These factors include an increase in a data amount, an increase in parameters of a model, and the like. As one scheme that decreases a learning time, it is possible to cite parallel processing of a calculation for optimization by using a plurality of workers (resources such as a plurality of central processing unit (CPU) cores and a plurality of calculation nodes). A set of parameters are divided into subsets of parameters being called a block. Generally, one worker performs optimization processing for parameters belonging to one block.

As a scheme for parallelization, a scheme that distributes processing by dividing data exists. This is effective when a data amount is large. Moreover, there also exists a scheme that divides parameters into several blocks and then optimizes only a part of parameters by each worker. This is effective when the number of dimensions of a model is large. The present invention relates to the latter parallelization scheme. Note that the larger the number of dimensions of a model is, the higher precision of accuracy of calculation becomes.

NPL 1 discloses a scheme that clusters parameters, based on a correlation between characteristic amounts, and performs sequential processing for optimization. This scheme targets a linear model to which a characteristic amount of data and a parameter are related, and clusters parameters, based on a correlation between characteristic amounts. Each of a plurality of CPU cores performs sequential processing for optimization with regard to only a parameter belonging to a cluster.

CITATION LIST

Non Patent Literature

[NPL 1] Scherrer, Chad, et al. "Feature clustering for accelerating parallel coordinate descent." NIPS'12 Proceedings of the 25th International Conference on Neural Information Processing Systems, Pages 28 to 36, Lake Tahoe, Nev.—Dec. 3 to 6, 2012

SUMMARY OF INVENTION

Technical Problem

However, the scheme disclosed in NPL 1 is not paying attention to a fact that each of parameters divided into blocks differs in a degree of convergence in a process of optimization. In order to efficiently complete convergence of all parameters in a short time, no more optimization is needed with regard to a sufficiently converged parameter, and further optimization is needed with regard to only a parameter that is not converged yet. When parameters differing in kinds of convergence and in speeds are unevenly distributed in a worker, an amount of calculation for optimization needed for a parameter assigned to each worker differs. In other words, since degrees of convergence of parameters differ between workers, a long time is required until all parameters are converged.

Thus, in view of the above-described problem, the present invention is intended to provide a distributed machine learning device and the like which can efficiently converge a plurality of parameters.

Solution to Problem

To solve the above problems, a first aspect of a distributed machine learning device according to the present invention includes:

a block configuration determination means that determines a plurality of configurations of blocks each being a subset of a plurality of parameters used for a prediction model, and acquires a change amount of each subset of parameters belonging to the block, based on a result of executing processing of optimizing the plurality of parameters, and changes an element of the subset of the parameters in the block, based on the acquired change amount.

A second aspect of a distributed machine learning method according to the present invention includes:

determining a plurality of configurations of blocks each being a subset of a plurality of parameters used for a prediction model; and acquiring a change amount of each subset of parameters belonging to the block, based on a result of executing processing of optimizing the plurality of parameters, and changing an element of the subset of the parameters in the block, based on the acquired change amount.

A third aspect of a distributed machine learning program according to the present invention causes a computer to achieve:

determining a plurality of configurations of blocks each being a subset of a plurality of parameters used for a prediction model; and acquiring a change amount of each subset of parameters belonging to the block, based on a result of executing processing of optimizing the plurality of parameters, and changing an element of the subset of the parameters in the block, based on the acquired change amount.

Note that a distributed machine learning program may be stored in a non-transitory storage medium.

Advantageous Effects of Invention

According to the present invention, it is possible to provide a distributed machine learning device and the like which can efficiently converge a plurality of parameters.

BRIEF DESCRIPTION OF DRAWINGS

FIG. 2 is a diagram illustrating a data configuration example inside a parameter information storage unit.

FIG. 3 is a diagram illustrating a data configuration example inside a block information storage unit.

FIG. 9 is diagram illustrating one example of a data configuration inside a parameter characteristic storage unit.

EXAMPLE EMBODIMENT

First Example Embodiment

Generally, a distributed machine learning device is intended to optimize a prediction model by use of learning data. A prediction model is characterized by a plurality of parameters that each take a discrete value or a continuous value. Thus, optimization of a model means optimizing a parameter of a model. Optimization is to optimize a loss function calculated from learning data and a model. Learning data are data used by a prediction model for machine learning.

Optimization is achieved by repeating sequential processing while considering a change amount (change rate) between certain processing and next processing. As an example of optimization, there exists a gradient descent method that repeats, for the number of parameters, processing of calculating a gradient value in a current parameter, multiplying the gradient value by an appropriate rate, and then supplementing a loss function. Although a gradient descent method is described as an example in a first example embodiment, contents of sequential processing for optimization are not limited to this. In the present example embodiment, a gradient value representing a gradient is a change rate when a certain parameter changes to a next parameter.

When sequential processing for optimization is repeated, a parameter becomes close to an optimal value. Thus, an update difference of a calculated parameter becomes smaller each sequential processing. When a value of a parameter becomes hardly updated even by performing sequential processing, it is expressed that "the parameter is converted".

In the first example embodiment, optimization of parameters is executed in parallel in a plurality of workers 150a, 150b, and 150c (hereinafter, described as 150a to 150c). Workers denote resources such as a plurality of CPU cores and a plurality of calculation nodes. A characteristic of the first example embodiment is in equalizing degrees of convergence of parameters in workers 150a to 150c with one another. A set of parameters targeted for optimization is divided into subsets of parameters called blocks. One worker performs optimization processing for a parameter belonging to one block. Workers 150a to 150c that perform sequential processing for a certain block may be fixed, or workers 150a to 150c that perform sequential processing for a block may be changed each sequential processing.

(Distributed Machine Learning Device)

Figure 1:
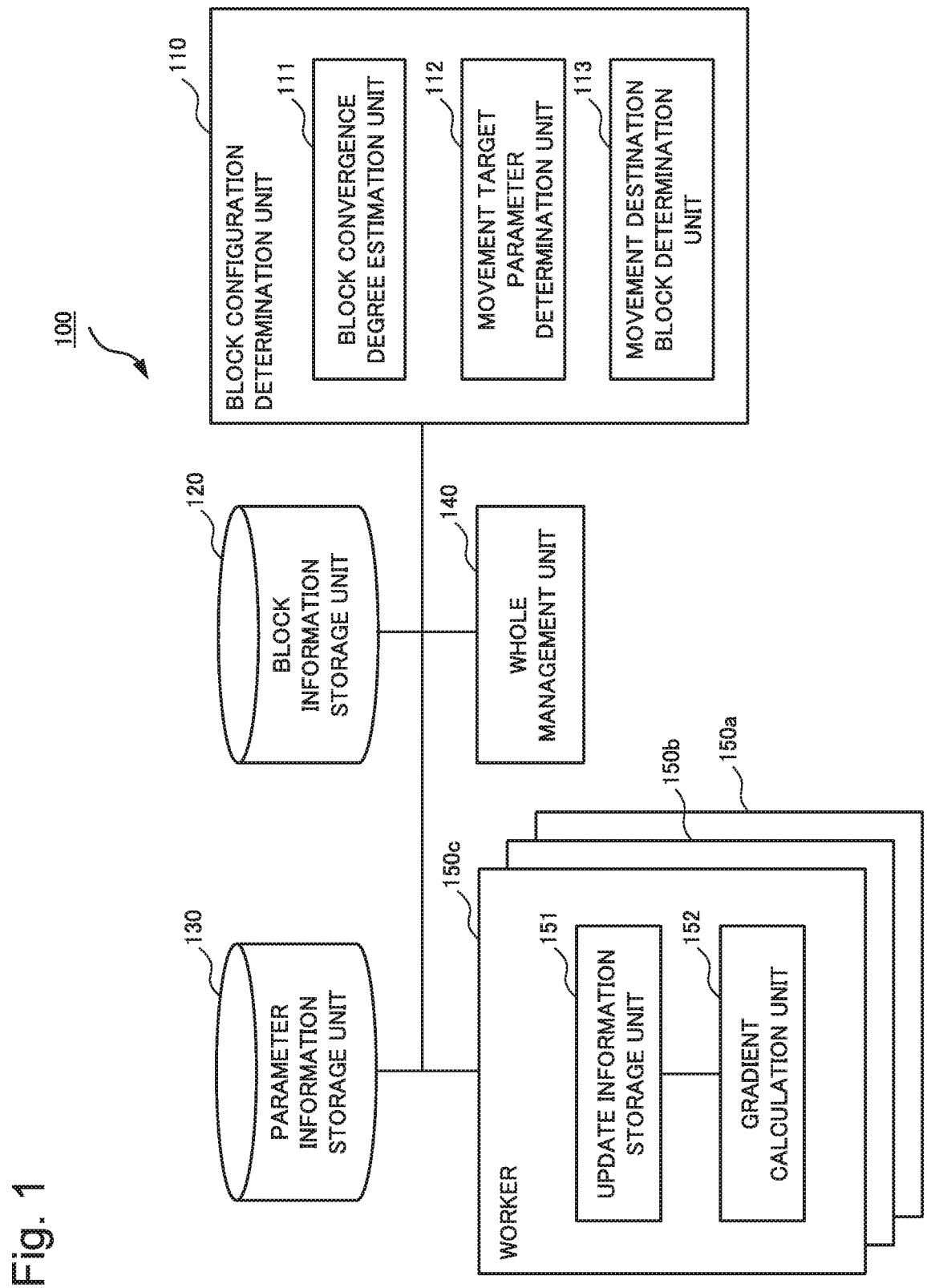
FIG. 1 is a block diagram illustrating a configuration example of a distributed machine learning device according to a first example embodiment of the present invention.

Distributed machine learning device 100 according to the first example embodiment of the present invention is described with reference to the drawings. FIG. 1 is a block diagram illustrating a configuration example of distributed machine learning device 100. Distributed machine learning device 100 includes block configuration determination unit 110, block information storage unit 120, parameter information storage unit 130, whole management unit 140, and workers 150a to 150c.

Parameter information storage unit 130 stores information pertaining to a parameter of a prediction model being a target for optimization. As information pertaining to a parameter, a change amount (the change amount indicates a degree at which a parameter is converted. Hereinafter, this degree is described as a "convergence degree") of each parameter may be stored. Information pertaining to a parameter is also called parameter information. Block configuration determination unit 110 and workers 150a to 150c acquire parameter information from parameter information storage unit 130 according to need. Moreover, parameter information storage unit 130 also stores, as parameter information, a value of a parameter or an update difference of a parameter value notified of from workers 150a to 150c.

One example of a configuration of data in parameter information storage unit 130 is illustrated in FIG. 2. Parameter information includes, as data items, a "parameter identifier (ID)", a "value" and a "gradient value". The parameter ID is an ID with which a parameter is uniquely identified. A value is a value of a parameter. A gradient value is a value representing a gradient calculated in previous sequential processing. Note that a gradient value as a convergence degree of a parameter is not essential, but a gradient value is included in parameter information in the first example embodiment.

Block information storage unit 120 records, for each block, block information indicating that parameter belongs to the block. As illustrated in FIG. 3, block information includes a "block ID" and a "parameter ID that belongs" as data items. The block ID is an ID with which a block can be uniquely identified. The parameter ID that belongs indicates a set of parameters (parameter IDs) belonging to a block linked to the block ID.

Block information is read at a request of each of workers 150a to 150c. Moreover, block information is updated in response to a request or an instruction from block configuration determination unit 110.

Block configuration determination unit 110 changes a configuration of a block being a set of parameters, depending on a degree of convergence of each parameter. Block configuration determination unit 110 determines a configuration of a block being a subset of a plurality of parameters used for a prediction model. In other words, configurations of a plurality of blocks are determined. Moreover, block configuration determination unit 10 acquires a change amount of each parameter in a subset of parameters belonging to a block, based on a result of executing processing of optimizing a plurality of parameters by a worker. Block configuration determination unit 10 changes an element of the subset of the parameters in the block, based on the acquired change amount.

Block configuration determination unit 110 includes block convergence degree estimation unit 111, movement target parameter determination unit 112, and movement destination block determination unit 113.

Block convergence degree estimation unit 111 estimates a convergence degree of a subset of parameters, based on a change amount (a convergence degree of a parameter) of each subset of parameters belonging to a block. A subset of parameters indicates a plurality of parameters belonging to each block. Note that a gradient value can be cited as an example of a value indicating a convergence degree of a parameter. A gradient value of each of a plurality of parameters belonging to a same block may be a normalized value. Thus, it is possible to have no influence on a calculation result even when each parameter has a different scale.

A convergence degree of a block (block convergence degree) is calculated by use of convergence degrees of all parameters belonging to the block. A block convergence degree is calculated as, for example, an average of convergence degrees of all parameters belonging to a block. Block convergence degree estimation unit 111 calculates block convergence degrees for all blocks. Block configuration determination unit 110 may transitorily store a calculated block convergence degree in a working memory (not illustrated) or the like.

Movement target parameter determination unit 112 determines a movement target parameter to be moved from a block to which the parameter currently belongs to another block, based on a convergence degree of a parameter estimated by block convergence degree estimation unit 111. It is assumed that block IDs are indexes (i), i.e., 1, 2, . . . , and B (B is a total block number), and then, block convergence degrees of respective blocks are $c_1, c_2, \ldots,$ and $c_B$. It is also assumed that the number of parameters belonging to a block i at a time t is $N_i(t)$.

At a next time t+1, movement target parameter determination unit 112 determines the number of parameters $N_i(t+1)$ belonging to each block i, based on the calculated convergence degree of the block. As one example, the number of parameters belonging to a block at the time t+1 is determined in inverse proportion to a convergence degree of each block. In other words, movement target parameter determination unit 112 determines the number of parameters belonging to a block at the time t+1 in such a way as to satisfy Equation (1) below.

[Equation 1]

$$N_1(t):N_2(t): \ldots :N_B(t) = \frac{1}{c_1}:\frac{1}{c_2}: \ldots :\frac{1}{c_B} \quad (1)$$

Movement target parameter determination unit 112 calculates, for each block i, $\{N_i(t)-N(t+1)\}$ representing a change amount of a subset of parameters belonging to the block i. A calculation result, when being positive, indicates that the number of parameters belonging to a block i is decreased, i.e., a load of the block is decreased. A calculation result, when being negative, indicates that the number of parameters belonging to a block i is increased, i.e., a load of the block is increased. Movement target parameter determination unit 112 randomly selects $\{N_i(t)-N_i(t+1)\}$ parameters from a block i a calculation result of which becomes negative, and then designates the parameters as movement target parameters. Block configuration determination unit 110 may transitorily store information on a movement target parameter in a working memory (not illustrated) or the like. Movement target parameter determination unit 112 executes this operation for all blocks (workers).

Movement destination block determination unit 113 determines a block to become a movement destination, from among a plurality of blocks, for all parameters designated as movement target parameters. Movement destination block determination unit 113 randomly selects one block from among such blocks that the change amount $\{N_i(t)-N(t+1)\}$ of a subset of parameters in each block calculated earlier is positive, for all parameters designated as movement target parameters. Then, movement destination block determination unit 113 designates the block as a movement destination block. This is indented to move a parameter belonging to a block having a great load of parameter optimization processing to a block having a small load. As a result, convergence degrees of parameters are equalized with one another in workers 150a to 150c. Movement of a block is limited for the block i in such a way that a sum of the number of parameters already existing in the block and the number of parameters to become movement targets does not exceed $N_i(t+1)$. Consequently, a block including the number of parameters conforming to $N_i(t)$ (i=1, 2, . . . , B) is configured after parameter movement.

Block configuration determination unit 110 controls in such a way as to update, i.e., reconfigure block information of block information storage unit 120 in accordance with a configuration of a block calculated earlier, i.e., information indicating which block has which parameter.

Each of workers 150a to 150c is an aggregate of workers. An input/output to each of workers 150a to 150c is not the same, but processing performed inside each of workers 150a to 150c is the same.

Each of workers 150a to 150c includes update information storage unit 151 and gradient calculation unit 152.

Figure 4:
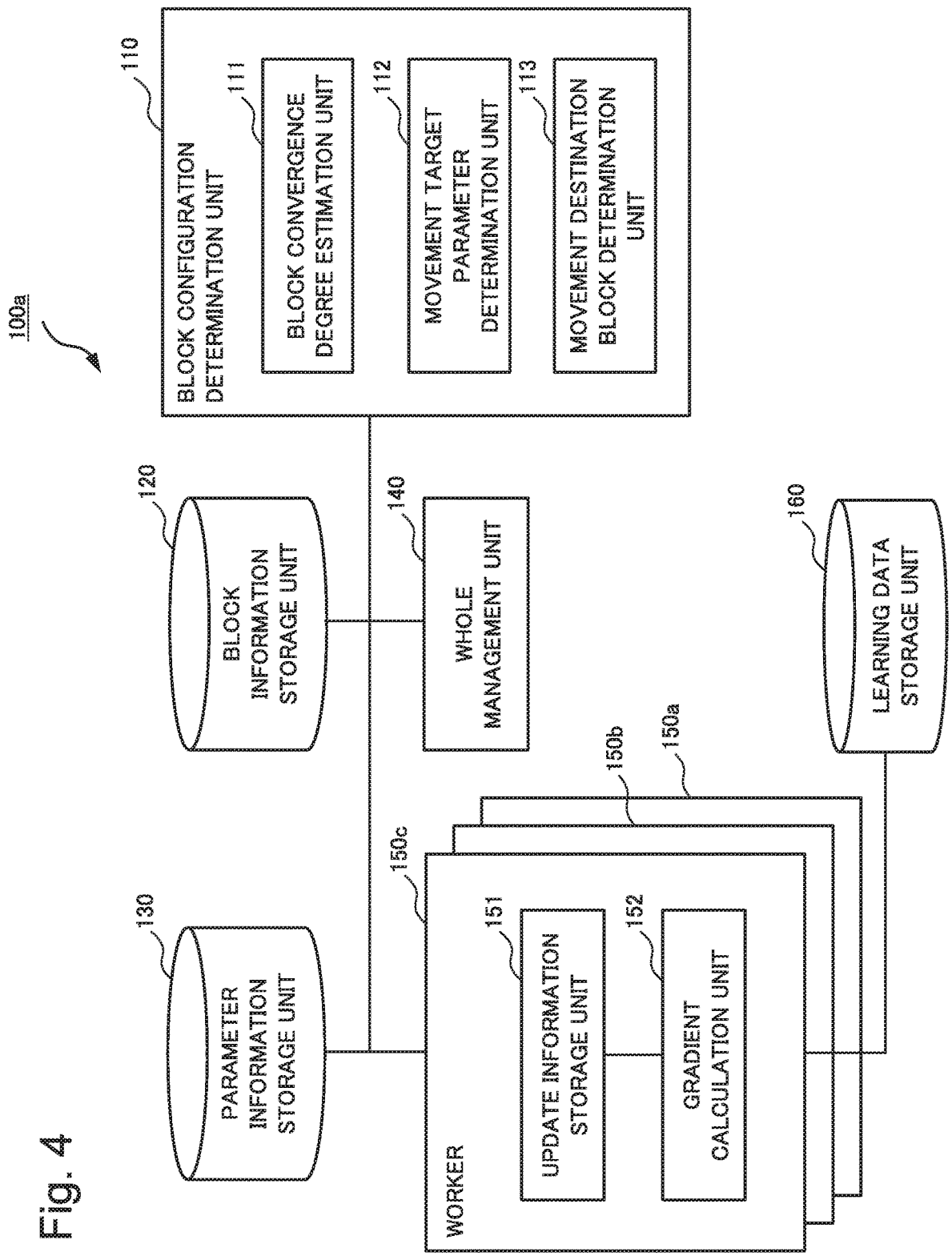
FIG. 4 is a block diagram illustrating a modification example of the distributed machine learning device according to the first example embodiment of the present invention.

Update information storage unit 151 stores a parameter value (θ) and learning data (η) that are needed for calculation of a gradient. Each of workers 150a to 150c acquires a parameter ID linked to a block related to each of workers 150a to 150c from block information storage unit 120. Each of workers 150a to 150c acquires the parameter value θ linked to the parameter ID from parameter information storage unit 130, and then stores the parameter value θ in update information storage unit 151. Learning data may be saved in a learning data storage unit (not illustrated) inside each of workers 150a to 150c. Alternatively, in such a way as a distributed machine learning device illustrated in FIG. 4, learning data storage unit 160 may be communicably connected. Learning data storage unit 160 stores learning data. In this case, each of workers 150a to 150c entirely or partly acquires learning data that are needed for optimization learning of a parameter, from learning data storage unit 160.

Gradient calculation unit 152 substitutes the parameter value θ and learning data recorded in update information storage unit 151 for an optimization algorithm (function) of a gradient descent method, and thus acquires a calculation result. Thereby, gradient calculation unit 152 outputs a gradient value of a parameter.

Each of workers 150a to 150c executes sequential processing concerning optimization of a parameter, based on learning data, i.e., causes a prediction model to learn by use of the learning data, and improves (optimizes) a parameter of the prediction model. Each of a plurality of workers 150a to 150c operates in parallel, and thereby performs optimization of a parameter. An operation of sequential processing for optimization performed by workers 150a to 150c is described below based on a gradient descent method.

Each of workers 150a to 150c acquires, from block information storage unit 120, an ID of a parameter included in a block indicated by a block ID. Thereafter, each of workers 150a to 150c acquires a current value θ1 of a parameter related to an acquired parameter ID from parameter information storage unit 130, and records the value θ1 in update information storage unit 151.

Each of workers 150a to 150c entirely or partly acquires learning data in order to calculate a gradient (designates the learning data as learning data η1), and then records the learning data η1 in update information storage unit 151.

Gradient calculation unit 152 substitutes the parameter value θ1 and the learning data η1 recorded in update information storage unit 151 for a predetermined calculation equation for optimization, and calculates a gradient value g1 of the parameter. Each of workers 150a to 150c updates the parameter value θ1 stored in update information storage unit 151, based on the gradient value g1, and outputs a new parameter value θ2. Gradient calculation unit 152 of each of workers 150a to 150c records parameter information including the updated parameter value θ2 in parameter information storage unit 130. The gradient value g1 may be included in parameter information. Further, a new gradient value g2 calculated by use of the parameter value θ1, the parameter value θ2, and the like may be included in parameter information.

In this instance, gradient calculation unit 152 may erase parameter information (the parameter value θ1 and the like) previously recorded in update information storage unit 151, and the learning data η1 previously recorded in learning data storage unit 160. The above is sequential processing for optimization performed by workers 150a to 150c.

Each of workers 150a to 150c executes the above-described sequential processing for a predetermined time or a predetermined number of times. Workers 150a to 150c may be synchronized with one another during processing. In other words, workers 150a to 150c may be controlled in such a way that next sequential processing is not started until all workers 150a to 150c finish certain sequential processing. Contrarily, each of workers 150a to 150c may independently advance processing. In other words, each of workers 150a to 150c may finish sequential processing at a pace of the worker without waiting for finishing of sequential processing of other workers 150a to 150c.

Whole management unit 140 performs schedule management for sequential calculation of workers 150a to 150c and a configuration of a block. Whole management unit 140 instructs each of workers 150a to 150c to execute sequential calculation for optimization only a given number of times or for a given time. After the execution, whole management unit 140 performs convergence determination of entire optimization, based on a convergence degree of a parameter by sequential processing in workers 150a to 150c. In convergence determination of optimization, whole management unit 140 determines whether or not a parameter is sufficiently converted, and sequential processing for optimization is not needed any more. One example of determination of convergence is to determine whether or not a total of previous gradient values exceeds a predetermined threshold value. Another determination example is to determine whether or not a value of a loss function calculated by predetermined data (preferably data that are not used for learning) and a current parameter exceeds a predetermined threshold value. When a result of convergence determination is true, whole management unit 140 finishes an operation of distributed machine learning device 100. When a result of convergence determination is false, whole management unit 140 requests block configuration determination unit 110 to again perform an operation.

(Operation of Distributed Machine Learning Device)

Figure 5:
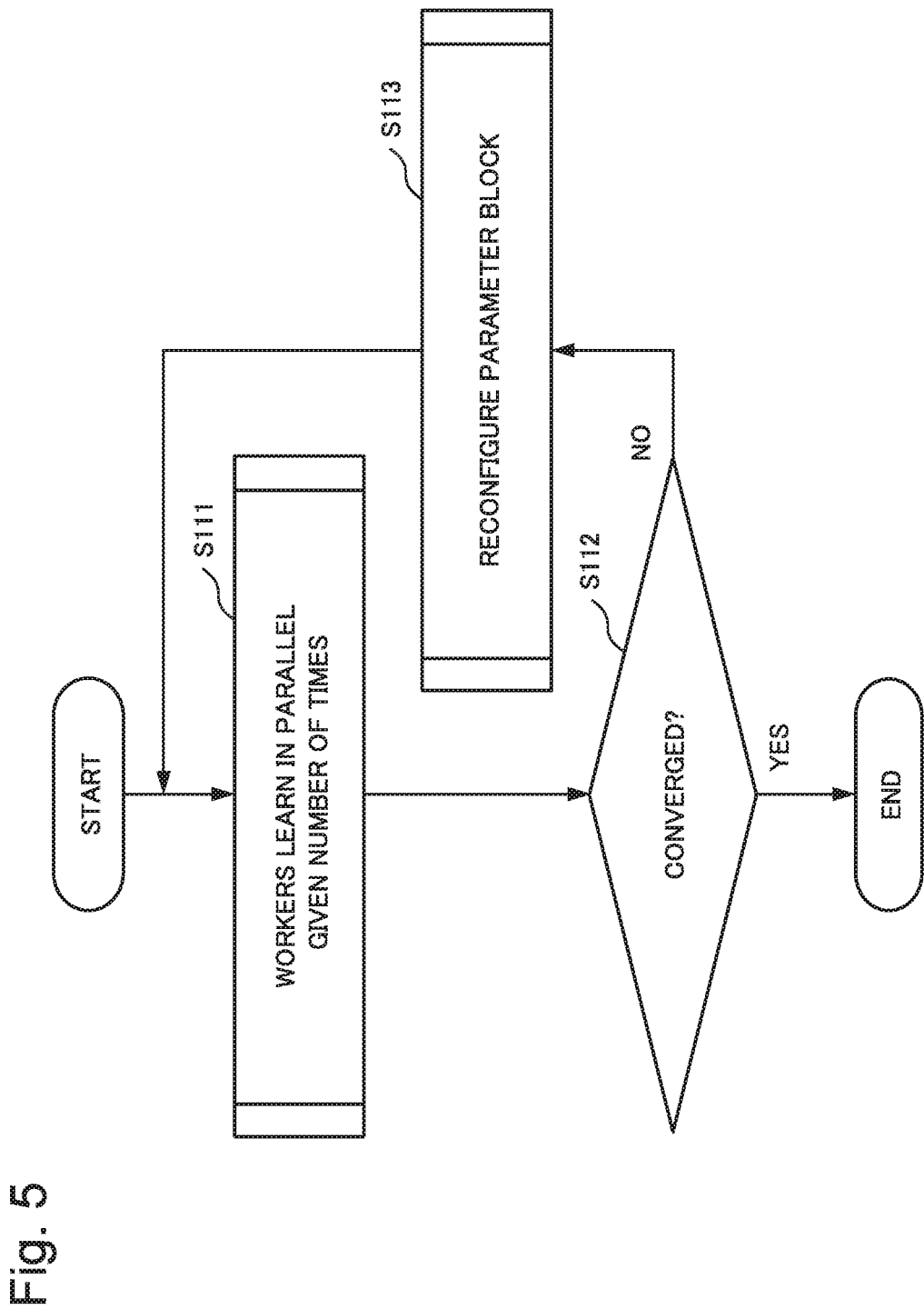
FIG. 5 is a flowchart illustrating an operation example of a distributed machine learning device according to a first example embodiment of the present invention.
Figure 6:
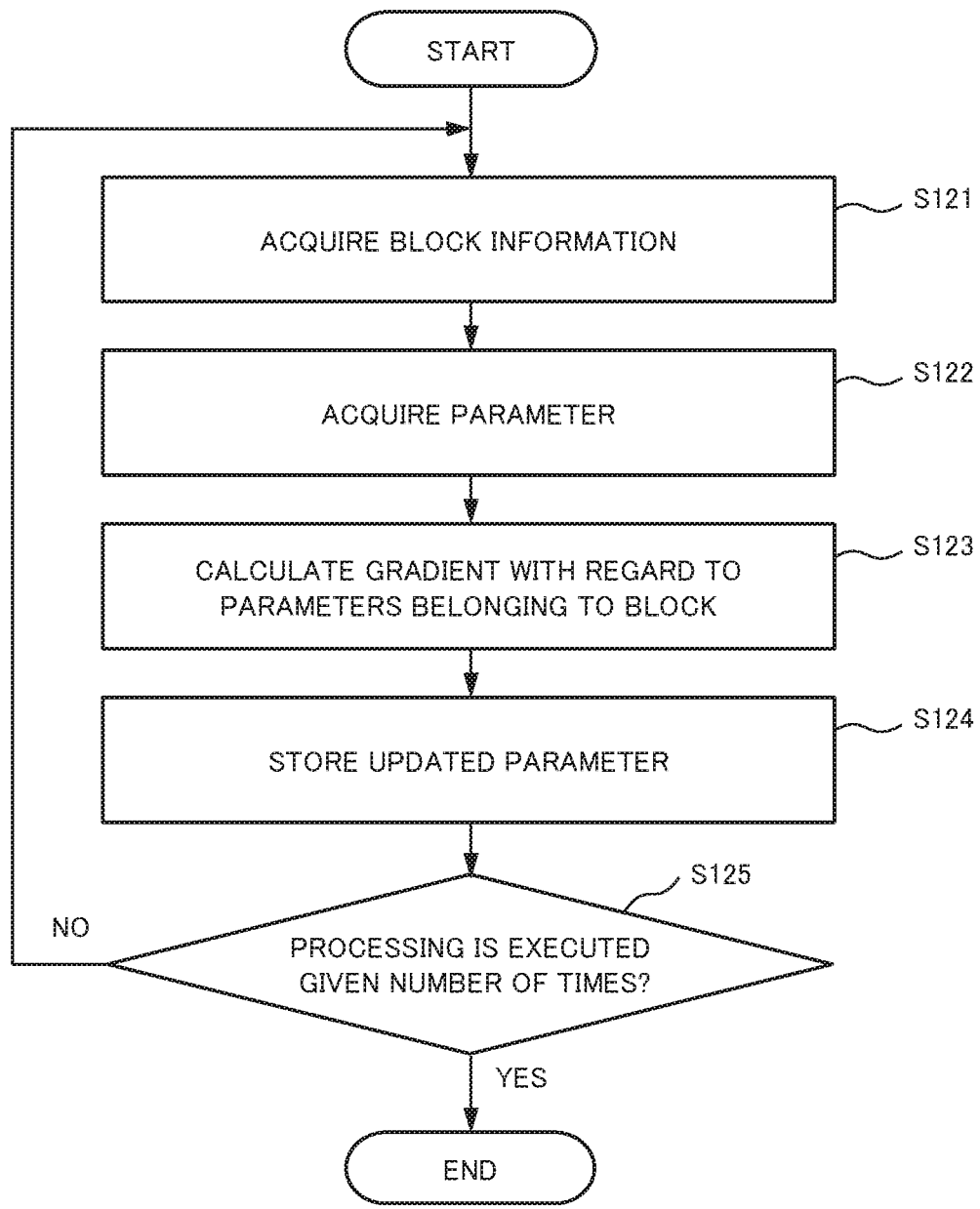
FIG. 6 is a flowchart illustrating an operation example of a worker.

An operation of distributed machine learning device 100 in the first example embodiment of the present invention is described with reference to flowcharts in FIGS. 5 to 7. A flow of an entire operation of distributed machine learning device 100, an operation flow of a worker, and an operation flow of block configuration determination unit 110 are described below in an order of description.

First, the entire operation of distributed machine learning device 100 is described with reference to the flowchart illustrated in FIG. 5.

In a step S111, whole management unit 140 of distributed machine learning device 100 instructs each of workers 150a to 150c to execute sequential processing in parallel a given number of times or at given time intervals. Each of workers 150a to 150c receiving the instruction executes sequential processing (learning for optimization).

In a step S112, whole management unit 140 determines whether or not processing for optimization is converged. When it is determined that processing for optimization is converged, whole management unit 140 finishes the operation of distributed machine learning device 100. When it is determined that processing for optimization is not converged, the processing is advanced to a step S113.

In the step S113, whole management unit 140 requests block configuration determination unit 110 to reconfigure a block of a parameter. Block configuration determination unit 110 reconfigures a block of a parameter.

Note that details of the above-described steps S111 and S113 will be described later in detail.

A detailed operation of the step S111, i.e., an operation of each of workers 150a to 150c is described with reference to the flowchart illustrated in FIG. 6.

First, in a step S121, each of workers 150a to 150c determines a block to be targeted for optimization by the worker (this block may be set in advance) in response to an instruction from whole management unit 140, and acquires a parameter ID belonging to the block from block information storage unit 120 (refer to FIG. 3).

In a step S122, each of workers 150a to 150c acquires, based on the acquired parameter ID, a parameter value θ1 linked to the parameter ID from parameter information storage unit 130 (refer to FIG. 2), and records the acquired parameter value θ1 in update information storage unit 151.

In a step S123, gradient calculation unit 152 of each of workers 150a to 150c calculates, based on the acquired parameter value θ1 and learning data η1, a gradient value g of a parameter of a block to be targeted for optimization, by use of a predetermined function or algorithm.

Moreover, gradient calculation unit 152 updates the parameter value θ1 by use of the calculated gradient value g.

In a step S124, gradient calculation unit 152 of each of workers 150a to 150c stores an updated parameter value θ2 in parameter information storage unit 130 (refer to FIG. 2).

In a step S125, each of workers 150a to 150c determines whether or not sequential processing is executed a given number of times. When it is determined that sequential processing is executed a given number of times, each of workers 150a to 150c finishes the operation. When it is determined that sequential processing is not executed a given number of times, each of workers 150a to 150c returns the processing to the step S121, and again executes the sequential processing in the steps S121 to S124. Note that each of workers 150a to 150c may determine whether or not each of workers 150a to 150c has executed sequential processing a given number of times and at given time intervals.

Accordingly, the operation of each of workers 150a to 150c is finished.

A detailed operation of the step S113, i.e., an operation of block configuration determination unit 110 is described with reference to the flowchart in FIG. 7.

In a step S131, block convergence degree estimation unit 111 of block configuration determination unit 110 estimates a convergence degree of a block in response to a request for reconstruction from whole management unit 140. Thus, block convergence degree estimation unit 111 first estimates a convergence degree of each parameter. As one example, a convergence degree of a parameter is a previous gradient value of the parameter. As another example, a value acquired by normalizing gradient values of a plurality of parameters can also be used. Thus, a difference in scales of values of parameters can be neglected. Note that a calculation method of a convergence degree is not limited to these examples.

In a step S132, movement target parameter determination unit 112 calculates a change amount of each subset of parameters belonging to a block, based on an estimated convergence degree of the block. Further, based on the calculation result, movement target parameter determination unit 112 specifies a parameter to be moved for each block.

In a step S133, movement destination block determination unit 113 determines a block (block ID) of a movement destination for each parameter to be moved.

In a step S134, movement destination block determination unit 113 moves a parameter to a determined block. In other words, movement destination block determination unit 113 updates block information in block information storage unit 120 by use of a movement target parameter calculated earlier and an ID of a movement destination block. In this way, equalization of convergence degrees of parameters of each block is performed by movement of a parameter.

Accordingly, the operation of block configuration determination unit 110 is finished.

Advantageous Effect of First Example Embodiment

As described above, distributed machine learning device 100 according to the first example embodiment of the present invention can converge all parameters in a short time. A reason for this is that block configuration determination unit 110 equalizes degrees of convergence of parameters in workers 150a to 150c with one another.

Second Example Embodiment

Distributed machine learning device 200 according to a second example embodiment of the present invention is described. When starting optimization, distributed machine learning device 200 forms parameters into a block, based on a similarity between parameters. Then, distributed machine learning device 200 considers a similarity of a parameter when modifying (reconfiguring) a configuration of a block in a process of optimization as well.

A similarity between parameters is calculated as a distance between characteristics given to parameters. As one example of calculation, a characteristic is given as a multidimensional vector acquired by normalizing a characteristic, and a distance is calculated as a sum of squares of a difference between respective elements of a vector. A block of parameters when performing optimization is acquired by clustering parameters by the distance. Each cluster (block) has a central point, and this central point is called a centroid. When a characteristic is represented by a multidimensional vector, a centroid becomes an average of characteristic vectors of all parameters belonging to a block.

(Distributed Machine Learning Device)

Figure 8:
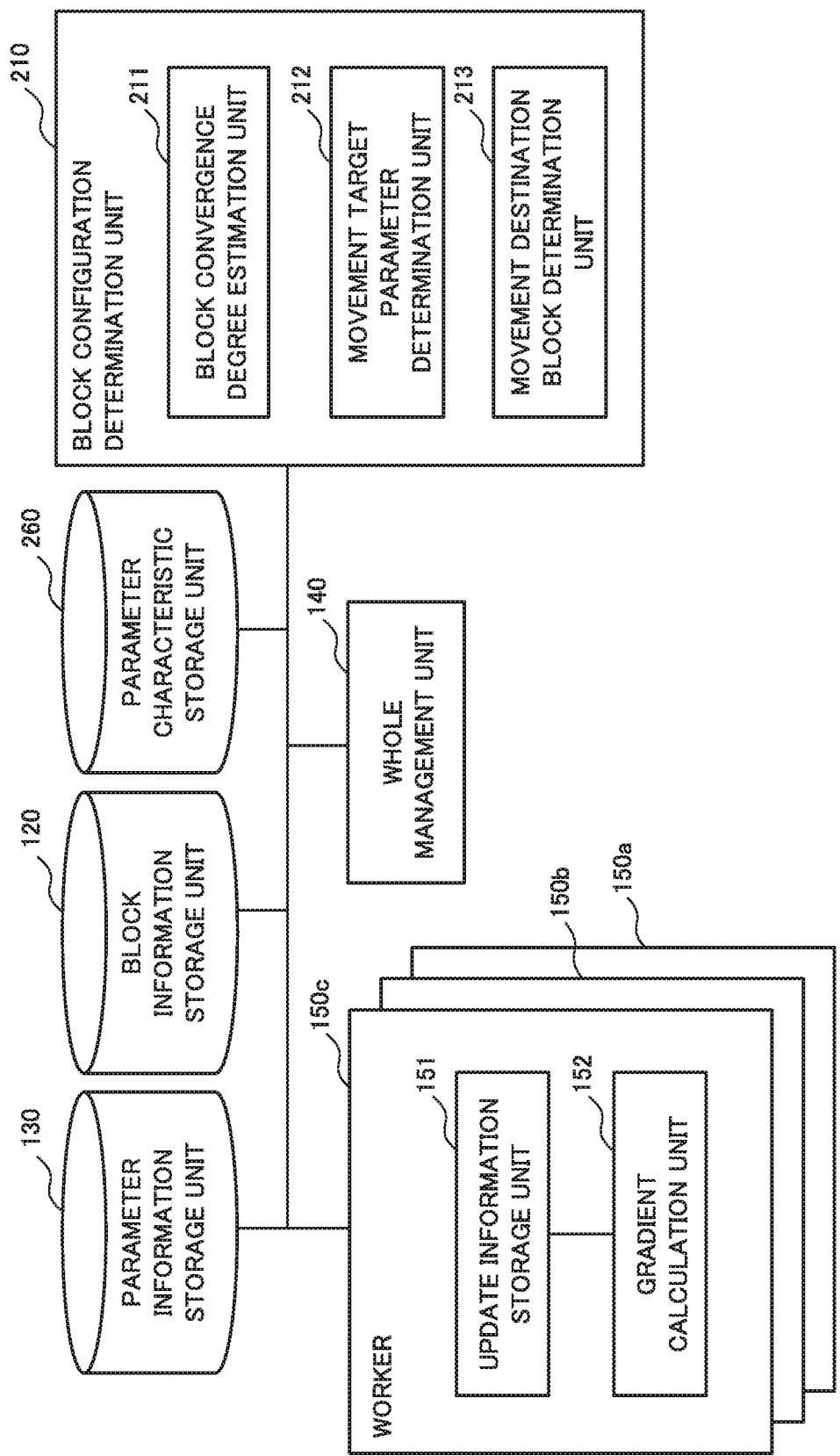
FIG. 8 is a block diagram illustrating a configuration example of a distributed machine learning device according to a second example embodiment of the present invention.

As illustrated in FIG. 8, distributed machine learning device 200 includes block configuration determination unit 210, block information storage unit 120, parameter information storage unit 130, whole management unit 140, workers 150a to 150c, and parameter characteristic storage unit 260.

Parameter characteristic storage unit 260 records characteristic information of a parameter. As illustrated in FIG. 9, parameter characteristic information includes, as data items, a "parameter ID" and a "characteristic". The parameter ID is an ID with which a parameter can be uniquely identified. As one example, a characteristic is a value of a multidimensional vector representing a characteristic.

Block configuration determination unit 210 includes block convergence degree estimation unit 211, movement target parameter determination unit 212, and movement destination block determination unit 213.

Block convergence degree estimation unit 211 estimates a convergence degree of a block. A convergence degree of a block is calculated from convergence degrees of all parameters belonging to a block. For example, block convergence degree estimation unit 211 calculates an average of convergence degrees of all parameters belonging to a block, and determines a calculation result as a convergence degree of a block. Note that an example of a value indicating a convergence degree of a parameter is a gradient value, or a value acquired by normalizing gradient values of a plurality of parameters belonging to a block. Block convergence degree estimation unit 211 calculates block convergence degrees for all blocks.

Movement target parameter determination unit 212 acquires information representing a similarity of each subset of parameters belonging to certain block from parameter characteristic storage unit 260, and determines a movement target parameter, based on the acquired information representing the similarity.

Information representing a similarity is described. First, movement target parameter determination unit 212 calculates a centroid of a block. In the example of the present example embodiment, movement target parameter determination unit 212 acquires characteristics (values) of all parameters belonging to a block from parameter characteristic storage unit 260, calculates an average of the acquired characteristics (values), and designates, as a centroid, a value being a calculation result. Moreover, movement target parameter determination unit 212 calculates a distance between each of all the parameters belonging to the block and the centroid, and then arranges the parameters in descending order of the distances. Further, movement target parameter determination unit 212 sets calculated $|N_i(t)-N_i(t+1)|$ (the number of parameters) as a movement target parameter in descending order of the distances. In other words, this distance serves as information representing a similarity.

Movement destination block determination unit 213 determines movement destination blocks for all parameters designated as movement target parameters. Movement destination block determination unit 213 selects one block, and then designates the block as a movement destination block. This block is a block (i.e., a block having a small load) in which a difference $\{N_i(t)-N(t+1)\}$ of the number of parameters of a block calculated earlier among all the parameters designated as movement target parameters is positive. This block is also a block (a block having a characteristic close to an average) closest from the centroid. Note that the respective blocks may be arranged in ascending order of distance from the centroid, and a movement destination block may be selected along this order.

In this instance, movement destination block determination unit 113 places a limit on a block i in such a way that a sum of the number of parameters already existing in the block and the number of parameters to become movement targets does not exceed $N_i(t+1)$. Consequently, a block including the number of parameters conforming to $N_i(t)$ (i=1, 2, ..., B) is configured after parameter movement.

Block configuration determination unit 210 updates block information in block information storage unit 120 in accordance with a configuration of a block calculated earlier, i.e., information indicating which block has which parameter.

Other components are similar to those in the first example embodiment.

(Operation of Distributed Machine Learning Device)

Figure 10:
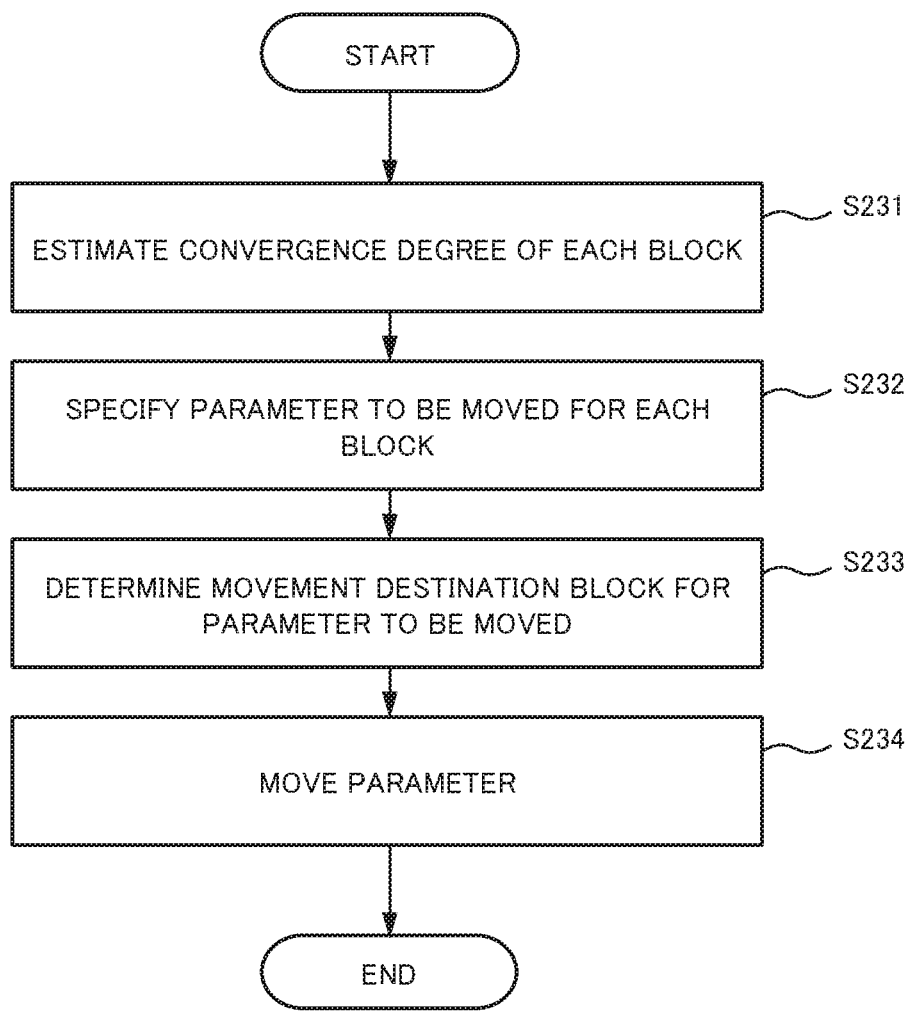
FIG. 10 is a flowchart illustrating an operation example of a block configuration determination unit of the distributed machine learning device according to the second example embodiment of the present invention.

An operation of block configuration determination unit 210 of distributed machine learning device 200 in the second example embodiment of the present invention is described with reference to FIG. 10. Note that a flow of an entire operation of distributed machine learning device 200, and an operation flow of a worker are similar to those in FIGS. 5 and 6, and therefore, a description is omitted.

First, in a step S231, block convergence degree estimation unit 211 estimates a convergence degree of a block.

In a step S232, movement target parameter determination unit 212 determines a parameter to be moved from a current block to another block, based on a block convergence degree. In this instance, movement target parameter determination unit 212 calculates a centroid of a block. Specifically, movement target parameter determination unit 212 calculates an average of characteristics of all parameters belonging to a block, and then sets a calculation result as a centroid. Further, movement target parameter determination unit 212 calculates a distance between each of all the parameters belonging to the block and the centroid, and then arranges the parameters in descending order of the distances. Further, movement target parameter determination unit 212 selects $|N_i(t)-N_i(t+1)|$ parameters along this order, and designates the selected parameters as movement target parameters. In other words, movement target parameters are set in descending order of the distances.

Figure 7:
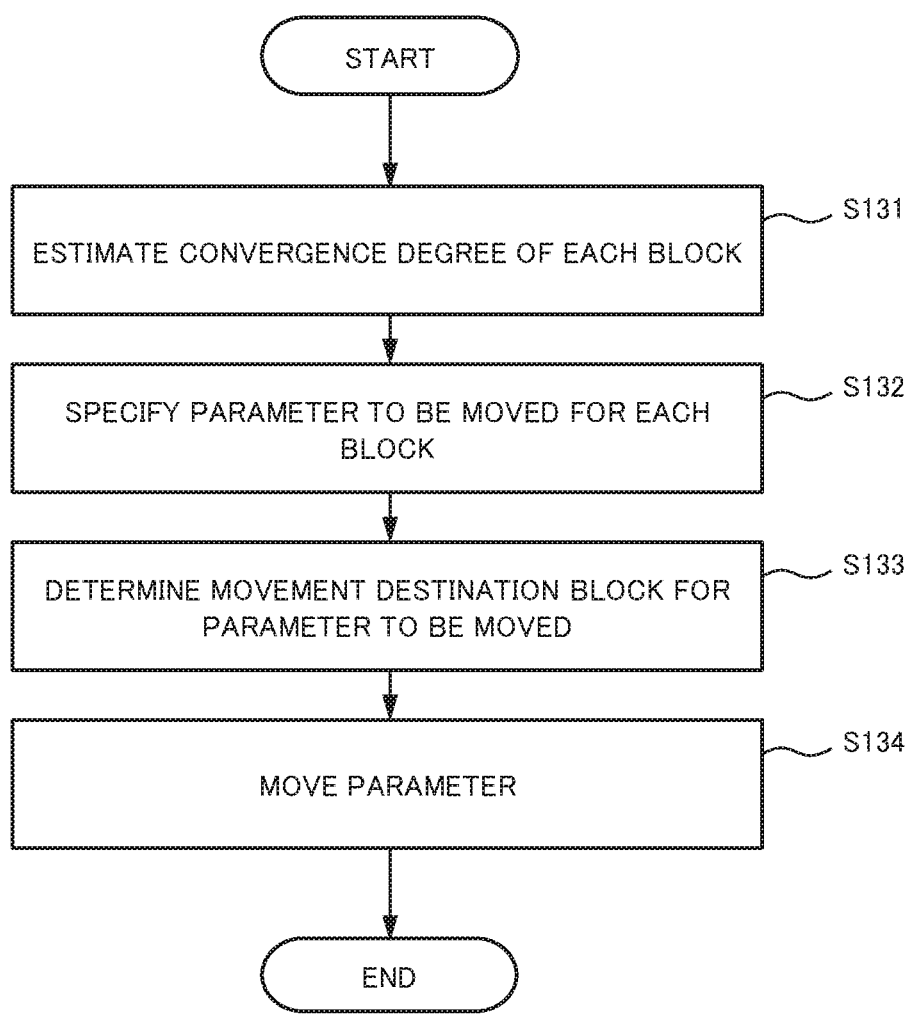
FIG. 7 is a flowchart illustrating an operation example of a block configuration determination unit.

Steps S233 and S234 are the same as the steps S133 and S134 in FIG. 7.

Accordingly, the operation of block configuration determination unit 210 is finished.

Advantageous Effect of Second Example Embodiment

Distributed machine learning device 200 according to the second example embodiment of the present invention can efficiently converge all parameters in a short time. A reason for this is that distributed machine learning device 200 equalizes degrees of convergence of parameters in workers 150a to 150c. Further, distributed machine learning device 200 can change a configuration of a block while making parameters included in the block similar to one another. Therefore, convergence for optimization can be further speeded up.

Third Example Embodiment

Figure 11:
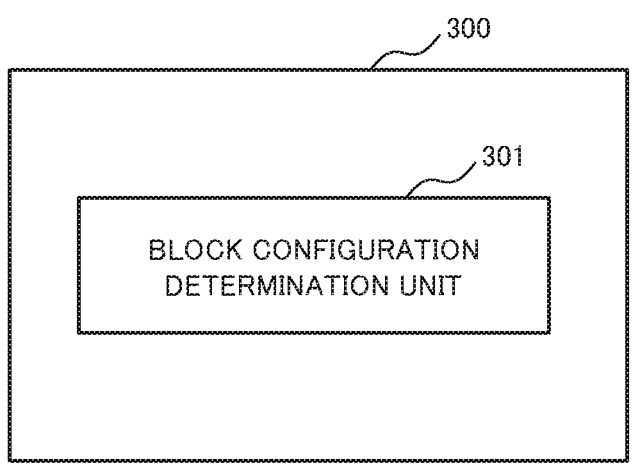
FIG. 11 is a block diagram illustrating a configuration example of a distributed machine learning device according to a third example embodiment of the present invention.

A third example embodiment of the present invention is a minimal configuration of the first and second example embodiments. As illustrated in FIG. 11, distributed machine learning device 300 according to the third example embodiment of the present invention includes block configuration determination unit 301 and a plurality of non-illustrated workers.

Block configuration determination unit 301 determines a configuration of a block being a subset of parameters, based on a result of executing processing of optimizing a parameter of a prediction model using learning data.

Each of the plurality of workers calculates a change amount (a convergence degree of a parameter) of each subset of parameters belonging to a block allocated to a local device, and changes the subset of the parameters, based on the calculation result.

Distributed machine learning device 300 according to the third example embodiment can efficiently converge a plurality of parameters in a short time. A reason for this is that a worker equalizes degrees of convergence of parameters with one another. Another reason is that block configuration determination unit 301 suitably reconfigures a block of parameters to be targeted for optimization.

(Configuration of Information Processing Device)

Figure 12:
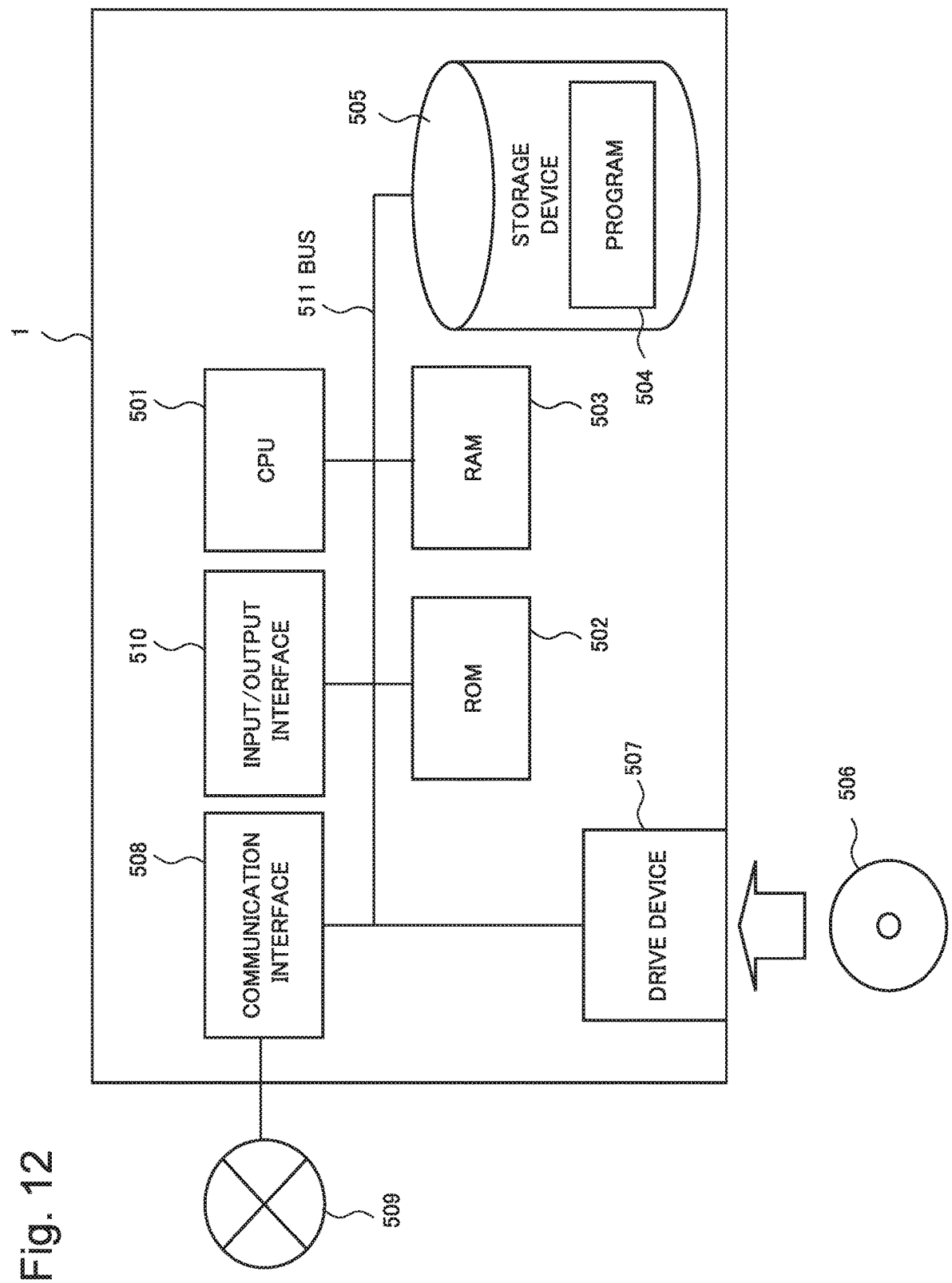
FIG. 12 is a configuration example of an information processing device for implementing each example embodiment of the present invention.

In each of the above-described example embodiments of the present invention, for each component of each of the distributed machine learning devices illustrated in FIGS. 1, 8, and 11, each component of the distributed machine learning device indicating a block of a functional unit is partly or entirely implemented by use of, for example, any combination of information processing device 1 as illustrated in FIG. 12 and a program. Information processing device 1 includes the following configuration as one example.

CPU 501
Read only memory (ROM) 502
Random access memory (RAM) 503
Program 504 loaded on RAM 503
Storage device 505 storing program 504
Drive device 507 that reads and writes in recording medium 506
Communication interface 508 that is connected to communication network 509
Input/output interface 510 that inputs/outputs data
Bus 511 that connects each component Each component of the distributed machine learning device according to each example embodiment of the present application is implemented by one or more CPUs 501 acquiring and then executing program 504 that implements a function of each component. Program 504 that implements a function of each component of the distributed machine learning device is stored in, for example, storage device 505 or RAM 503 in advance. CPU 501 reads program 504 according to need. Note that program 504 may be supplied to CPU 501 via communication network 509, or may be stored in recording medium 506 in advance, read by drive device 507, and then supplied to CPU 501.

An implementation method of each device includes various modification examples. For example, a distributed machine learning device may be implemented by any combination of an information processing device being separate for each component, and a program. Moreover, a plurality of components included in a distributed machine learning device may be implemented by any combination of one information processing device and a program.

Furthermore, each component of a distributed machine learning device is partly or entirely implemented by another general-purpose or dedicated circuit, processor, or the like, or a combination thereof. Each of these components may be configured by a single chip, or may be configured by a plurality of chips connected via a bus.

Each component of a distributed machine learning device may be partly or entirely implemented by a combination of the above-described circuit or the like and a program.

When each component of a distributed machine learning device is partly or entirely implemented by a plurality of information processing devices, circuits, or the like, the plurality of information processing devices, circuits, or the like may be centralizedly disposed or may be distributedly disposed. For example, an information processing device, a circuit, or the like may be implemented in a form, such as a client-and-server system or a cloud computing system, in which each device, circuit, or the like is connected via a communication network.

While the invention of the present application has been described above with reference to the present example embodiment and an example, the invention of the present application is not limited to the above-described example embodiment and example. Various changes that can be understood by a person skilled in the art can be made to a configuration and details of the invention of the present application within the scope of the invention of the present application.

This application is based upon and claims the benefit of priority from Japanese Patent Application No. 2017-052812, filed on Mar. 17, 2017, the disclosure of which is incorporated herein in its entirety by reference.

REFERENCE SIGNS LIST

1 Information processing device
100 Distributed machine learning device
110 Block configuration determination unit
111 Block convergence degree estimation unit
112 Movement target parameter determination unit
113 Movement destination block determination unit
120 Block information storage unit
130 Parameter information storage unit
140 Whole management unit
150a Worker
150b Worker
150c Worker
151 Update information storage unit
152 Gradient calculation unit
160 Learning data storage unit
200 Distributed machine learning device
210 Block configuration determination unit
211 Block convergence degree estimation unit
212 Movement target parameter determination unit
213 Movement destination block determination unit
260 Parameter characteristic storage unit
300 Distributed machine learning device
301 Block configuration determination unit
302a Worker
302b Worker
302c Worker
501 CPU
503 RAM
504 Program
505 Storage device
506 Recording medium
507 Drive device
508 Communication interface
509 Communication network
510 Input/output interface
511 Bus

What is claimed is:

1. A distributed machine learning device comprising:
a memory storing instructions; and
at least one processor configured to process the instructions for:
determining a plurality of configurations of blocks each being a subset of a plurality of parameters used for a prediction model,
acquiring a change amount of each subset of parameters belonging to a block, based on a result of executing processing of optimizing each of the parameters belonging to each of the blocks by a plurality of workers, and changing an element of the subset of the parameters in the block, based on the acquired change amount,
estimating, based on a change amount of each subset of parameters belonging to the block, a convergence degree of the subset of the parameters, and
deciding a movement target parameter to be moved from a block to which the parameter currently belongs, based on the estimated convergence degree.

2. The distributed machine learning device according to claim 1, the determining further comprising deciding for each of the movement target parameters, a block of a movement destination, from among the plurality of blocks.

3. The distributed machine learning device according to claim 2, further comprising:
a block information storage that stores, as block information, information on a parameter belonging to the block; and
a worker that executes processing of optimizing a parameter belonging to the block, by acquiring the block information from the block information storage and executing the processing of optimizing,
the deciding for each of the movement target parameters further comprising updating the block information, based on the movement target parameter and information on the block of the movement destination.

4. The distributed machine learning device according to claim 3, further comprising:
a parameter information storage that stores a change amount of each parameter included in the subset, wherein
the worker stores, in the parameter information storage, a change amount of each of the parameters acquired by executing processing of optimizing the parameter.

5. The distributed machine learning device according to claim 3, further comprising:
a learning data storage that stores the learning data to be learned by the prediction model, wherein the worker acquires learning data to be stored in the learning data storage, causes the prediction model to learn by use of the learning data, and optimizes the parameter.

6. The distributed machine learning device according to claim 1, further comprising:
a parameter characteristic storage that stores information representing a similarity between parameters in the subset,
the deciding a movement target parameter further comprising
acquiring information representing the similarity of each subset of parameters belonging to a certain block from the parameter characteristic storage, and determining the movement target parameter, based on the acquired information representing the similarity.

7. A distributed machine learning method comprising:
determining a plurality of configurations of blocks each being a subset of a plurality of parameters used for a prediction model;
acquiring a change amount of each subset of parameters belonging to a block, based on a result of executing processing of optimizing each of the parameters belonging to each of the blocks by a plurality of workers, and changing an element of the subset of the parameters in the block, based on the acquired change amount;
estimating, based on a change amount of each subset of parameters belonging to the block, a convergence degree of the subset of the parameters; and
deciding a movement target parameter to be moved from a block to which the parameter currently belongs, based on the estimated convergence degree.

8. A non-transitory computer-readable recording medium storing a distributed machine learning program that causes a computer to achieve:
determining a plurality of configurations of blocks each being a subset of a plurality of parameters used for a prediction model;
acquiring a change amount of each subset of parameters belonging to thea block, based on a result of executing processing of optimizing each of the plurality of parameters belonging to each of the blocks by a plurality of workers, and changing an element of the subset of the parameters in the block, based on the acquired change amount;
estimating, based on a change amount of each subset of parameters belonging to the block, a convergence degree of the subset of the parameters; and
deciding a movement target parameter to be moved from a block to which the parameter currently belongs, based on the estimated convergence degree.

9. The distributed machine learning device according to claim 4, further comprising:

a learning data storage that stores the learning data to be learned by the prediction model, wherein
the worker acquires learning data to be stored in the learning data storage, causes the prediction model to learn by use of the learning data, and optimizes the parameter.

10. The distributed machine learning device according to claim 2, further comprising:
a parameter characteristic storage that stores information representing a similarity between parameters in the subset,
the deciding a movement target parameter further comprising
acquiring information representing the similarity of each subset of parameters belonging to a certain block from the parameter characteristic storage, and determining the movement target parameter, based on the acquired information representing the similarity.

11. The distributed machine learning device according to claim 3, further comprising:
a parameter characteristic storage that stores information representing a similarity between parameters in the subset,
the deciding a movement target parameter further comprising
acquiring information representing the similarity of each subset of parameters belonging to a certain block from the parameter characteristic storage, and determining the movement target parameter, based on the acquired information representing the similarity.

12. The distributed machine learning device according to claim 6, further comprising:
a parameter characteristic storage that stores information representing a similarity between parameters in the subset,
the deciding a movement target parameter further comprising
acquiring information representing the similarity of each subset of parameters belonging to a certain block from the parameter characteristic storage, and determining the movement target parameter, based on the acquired information representing the similarity.

13. The distributed machine learning device according to claim 7, further comprising:
a parameter characteristic storage that stores information representing a similarity between parameters in the subset,
the deciding a movement target parameter further comprising
acquiring information representing the similarity of each subset of parameters belonging to a certain block from the parameter characteristic storage, and determining the movement target parameter, based on the acquired information representing the similarity.

* * * * *